United States Patent
Marie

[11] 3,877,789
[45] Apr. 15, 1975

[54] MODE TRANSFORMER FOR LIGHT OR MILLIMETER ELECTROMAGNETIC WAVES

[76] Inventor: Georges R. P. Marie, 17, rue Croland, Fontenay-aux-Roses, France, 92260

[22] Filed: Oct. 26, 1973

[21] Appl. No.: 410,216

[30] Foreign Application Priority Data
Nov. 8, 1972 France .............................. 72.39519
Jan. 9, 1973 France .............................. 73.00550
Oct. 9, 1973 France .............................. 73.36041

[52] U.S. Cl. .............................. 350/147; 350/157
[51] Int. Cl. .............................. G02b 5/30
[58] Field of Search .................... 350/147, 157, 159

[56] References Cited
UNITED STATES PATENTS
3,584,933  6/1971  Habegger .............................. 350/147
3,756,691  9/1973  Pasold .............................. 350/147

*Primary Examiner*—Ronald L. Wibert
*Assistant Examiner*—Michael J. Tokar
*Attorney, Agent, or Firm*—Abraham A. Saffitz

[57] ABSTRACT

Devices for transforming a linearly polarized beam of light or millimeter electromagnetic waves into waves having a revolution symmetry, particularly adapted to beams having a Gaussian energy distribution in their cross-section. Transformation is effected by optical means, using lenses or, alternately, a suitably arranged system of reflecting elements. The purpose of the device is to obtain a high concentration of beam energy in a small space.

4 Claims, 7 Drawing Figures

MODE TRANSFORMER FOR LIGHT OR MILLIMETER ELECTROMAGNETIC WAVES

The invention relates to a mode transformer for transforming rectilinearly polarized electromagnetic waves, e.g. from a millimeter wave source or a laser, into waves having symmetry of revolution. The device has numerous applications.

Firstly, it can be used to convey $TE_{01}$ waves having a wavelength of the order of 10 $\mu$ (10 microns) into circular wave guides, the guide being a capillary tube which is suitably metal-coated on the inside.

In other applications, use is made of the non-linear properties of the propagation medium in order to obtain parametric amplification or a change of frequency.

The invention enables more efficient use to be made of the phenomenon of self-focusing, which is defined hereinafter.

Self-focusing is a consequence of the non-linear properties of a propagation medium, which are such that the dielectric constant of the medium increases with the intensity of the electric field. The invention enables this phenomenon to be used in order to concentrate the laser power into displacement much smaller volume than that obtained in the prior art. electric It is known that thermonuclear fusion, for example, may liberate large quantities of energy but can occur only at very high temperatures. For example, the progressive fusion of hydrogen into helium occurs in the sun, by the Bethe cycle at a temperature of several million degrees.

As is known, attempts have been made to bring about fusion in the laboratory, by concentrating the energy of one or more very powerful lasers on the atoms which are to react.

In order to ensure that the resulting temperature is at a maximum, the energy must be concentrated into the minimum volume. Such a concentration can be obtained more easily by self-focusing. It is also known that lasers emit rectilinearly polarized waves. The aim of the invention is to transform the normal propagation mode of a laser beam into a mode having symmetry of revolution; the invention also relates to the means used for the purpose. This transformation has the advantage of producing much stronger self-focusing, i.e. a higher concentration of energy, as will be shown by analyzing what occurs in the rings of the electric and magnetic induction fields.

In a medium not containing electric charges, the electric and magnetic induction fields have zero divergence and, at each instant, their lines of force form closed, interlacing rings. A group of lines of force pressing against a closed outline form what is called a "tube of force." The flux of the electric induction field through the cross-section of the tube constitutes the displacement current. The integral of the electric field taken along a line of force between two sections constitutes the voltage between the two sections. We can thus define the impedance of a tube of force between two sections. These concepts are important in illustrating the phenomenon of self-focusing in a non-linear medium. Self-focusing can be explained by saying that the lines along which the displacement current flows are deflected towards the place where the impedance has been made lower than in a linear medium, since the dielectric constant becomes greater when the electric field is more intense.

This aspect of the self-focusing mechanism shows why the phenomenon is impeded if the tubes of force expand and form regions where the electric field is lower so that the dielectric constant does not increase, and where the higher impedance slows down the concentration of the displacement currents, which occurs instead in the regions where the tube cross-section is smaller and the electric field is stronger, resulting in variations in the dielectric constant which further concentrate the displacement current.

Consequently, the self-focusing effect will be more intense if the field is constant along the current lines, i.e. if the field has a structure of revolution around the axis of propagation, e.g. in the case of the $TE_{01}$ wave in a circular electric guide.

The invention provides means for transforming a rectilinearly polarized wave, e.g. from a laser, into a wave having symmetry of revolution and better adapted for self-focusing.

The invention can be embodied in a number of ways, using lenses in one case and suitably-shaped mirrors in other cases. We shall hereinafter describe three embodiments, the first using lenses and the second and third using mirrors or reflecting elements. For simplicity, the following description will be based on the assumption that the source of the waves is a laser, although the application of the invention is not limited to radiation from such a source.

The invention will be more clearly understood from the following description with reference to the accompanying drawings in which.

Figure 1:
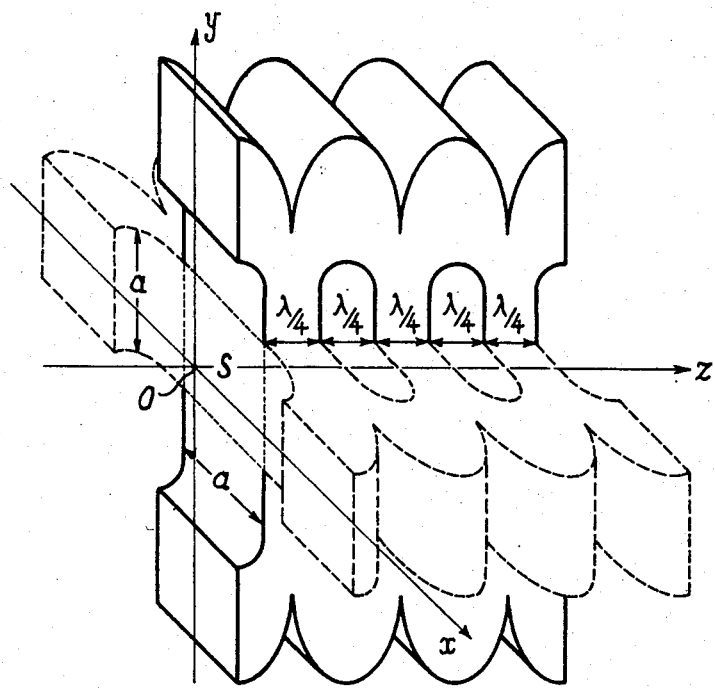
FIG. 1 illustrates a plane wave structure.

FIG. 1 is a simplified general diagram of the propagation of a plane wave. In FIG. 1, the Oy axis is parallel to the direction of propagation. At a given instant, the electric fields of force (shown in continuous lines) have lines of force which are on average parallel to the plane zOy, whereas the magnetic tubes of force (shown by broken lines) have lines of force parallel to the plane zOx.

Most of the energy is propagated in the square section S bounded by the values $x = \pm a/2$, $y = \pm a/2$. Outside this region, the fields close and are much less intense. We have assumed that the thickness of the current tubes in the neighborhood of the Oz is one quarter $\lambda/4$ of a wavelength symmetrically surrounding the line of maximum force at the instant in question. Under these conditions, the resulting current tube contains 83 percent of the energy. A quarter of a cycle later, the system of fields illustrated in FIG. 1 is cancelled and replaced by an identical system, offset by a quarter of a wavelength in the direction of propagation. The two systems are alternately produced and cancelled by variations in the induction flux thereof.

All the preceding remarks are true when the dielectric constant $\epsilon$ is independent of the field strength, and remain true when the constant $\epsilon$ increases with the field strength. In the latter case, however, new properties appear. Inside the tubes, the induction field is proportional to the reciprocal of the cross-section. Consequently, it will be much stronger in the neighborhood of the Oz axis, where it is perpendicular to $xOz$, than in distant regions, where it closes and has a component parallel to Oz. Consequently, as a first approximation, the dielectric constant will be stronger in the region bounded by $x = \pm a/2$ and $y = \pm a/2$, where it reaches a value $\epsilon'$, than outside the aforementioned region, where it stays at the value $\epsilon$.

Consequently, the structure of the resulting fields can be calculated by considering a wave guided by a square rod having a dielectric constant $\epsilon'$ in a medium having a dielectric constant $\epsilon$.

In the latter case, it is known that the wavelength is between $\lambda/\sqrt{\epsilon}$ and $\lambda/\sqrt{\epsilon'}$, which shows the interaction between the two regions having dielectric constants $\epsilon$ and $\epsilon'$. This interaction can be explained by saying that the impedance of the tube of force, considered in the region having a low dielectric constant, is in series with the impedance of the tube of force taken in the region having a strong dielectric constant. In order to avoid the last-mentioned disadvantage, the electric field must retain its value along an entire line of force; this is so when the electric lines of force are circles centered on the axis of propagation, as in the case of the $TE_{On}$ waves in circular electric wave guides.

We shall now show how such waves can be obtained by using lenses made of a material which is anisotropic or which is machined so as to have an anisotropic apparent refractive index.

Figure 2:
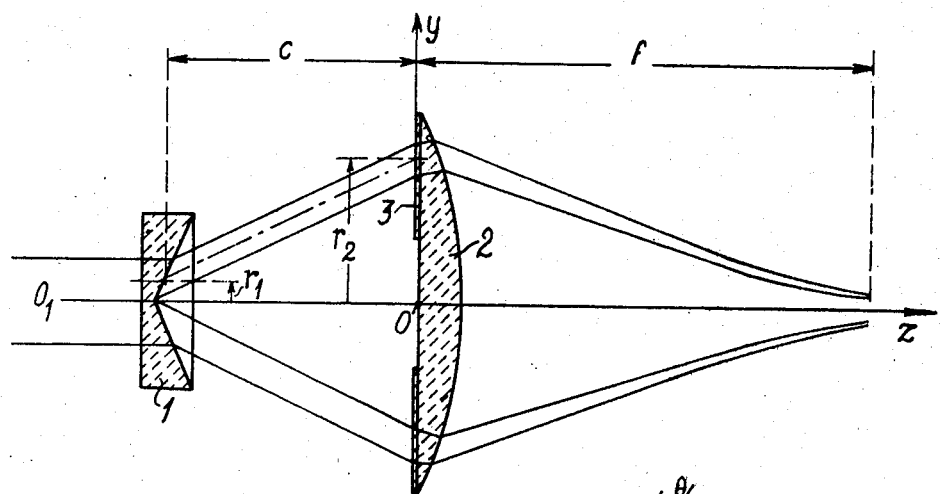
FIG. 2 is an axial cross-section of a device according to the invention, using lenses.

In FIG. 2, the device according to the invention is essentially characterized by a system of two lenses, the first of which is a special kind of divergent lens distributing the power radiated by the laser in a cone.

The second lens, one surface of which is flat and covered witih an anisotropic layer, suitably guides the electric field in the cone of rays, whereas the other surface of the second lens re-converges the wave in a form having symmetry of revolution.

Figure 3:
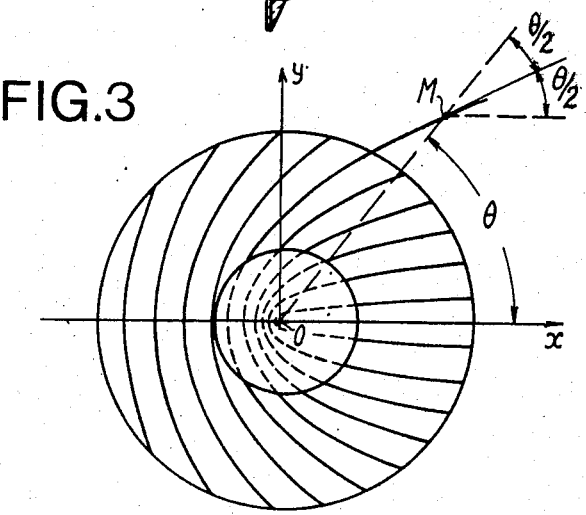
FIG. 3 shows the configuration which it is desired to produce on one side of the main lens in the device of FIG. 2, in order to obtain the desired anisotropic properties.

FIG. 2 shows a system of lenses operating in the aforementioned manner. FIG. 2 which, geometrically speaking, shows a symmetry of revolution around the Oz axis, shows a Gaussian beam $O_1$ coming from a laser, and a divergent lens 1 which has a hollow conical surface and which radiates the laser power in a cone. A lens 2 re-focuses the energy and, on its front surface, bears a layer 3 of an anisotropic substance whose slow axes are tangential to the lines given in FIG. 3 and whose characteristics can be calculated to ensure that the field, which was initially polarized along Oy, becomes circular around Oz. This property is retained when the rays converge. In the neighborhood of the focus, the energy is concentrated by self-focusing into a volume which is much smaller than the normal focal spot.

The cross-section of the lenses is calculated to allow for the fact that the fraction of the total power is conservative which is radiated in a cone having a light ray as its generatrix and the Oy axis of revolution as its axis. The procedure is as follows:

In the Gaussian beam $O_1$ parallel to the Oz axis, the electric field strength is given by a formula such as the following:

$$E = E_o e^{-r^2/\sigma^2} \quad (1)$$

$r$ being the distance of a point in the beam from the Oz axis, and $\sigma$ being a constant.

The fraction $F_1$ of the total power which, via lens 1, passes into the circle of radius $r_1$ is given by:

$$F_1(r_1) = \frac{\int_0^{r_1} E^2 \, 2\pi r \, dr}{\int_0^{\infty} E^2 \, 2\pi r \, dr} = 1 - e^{-r_1^2/\sigma^2} \quad (2)$$

It is desired that, in the plane of lens 2, the field $E_r$ be distributed in a ring, e.g. in accordance with an expression such as the following:

$$E_r = E_o [b^2 - (r_2 - a)^2] \quad (3)$$

for $(a-b) < r_2 < (a+b)$
and be zero outside this interval, i.e. $b < a$. The fraction $F_2$ of the total power which, via lens 2, passes into the circle of radius $r_2$ is given by:

$$F_2 = \frac{5b}{32a}(u^2-1)^3 + \frac{3u^5 - 10u^3 + 15u + 8}{16} \quad (4)$$

with $u = (r_2 - a)/b$

Since $F_2$ must be equal to $F_1$, we can calculate $r_2$ as a function of $r_1$, or, better, $u$ as a function of $v$ (putting $v = r_1/\sigma$). We can therefore write:

$$r_2 = bu(v) + a \quad (5)$$

Using $c$ to denote the distance between the two lenses and $e_1(r_1)$ to denote the thickness of lens 1 as a function of $r_1$ and allowing for the refractive index $n$ of the material and the known rate of deflection for small angles, we must have:

$$(n-1)\frac{de_1}{dr_1} = \frac{r_2 - r_1}{c} = \frac{b}{c}u(v) + \frac{a}{c} - \frac{r_1}{c} \quad (6)$$

or, by integration;

$$(n-1)e_1 = \frac{b\sigma}{c}\int_0^{r_1/\sigma} u(v)\,dv - \frac{r_1^2}{2c} + \frac{ar_1}{c} + \text{constant} \quad (7)$$

The section of lens 2 can be similarly calculated, by adding a term $(r_2/f)$ to the angle of deflection so that the beam converges at a distance $f$.

Having thus shown how the beam energy is disposed in a ring, we shall show how to use the equivalent of half-wave plates in order to guide the electric fields tangentially with respect to circles centered on Oy.

In light optics, half-wave plates are usually cut in anisotropic crystals, but they can also be made by forming a stack of thin layers alternately having different indices. The reason is that, when a stack is made of layers having a thickness $p_1$ and a dielectric constant $\epsilon_1$ alternating with layers having a thickness $p_2$ and a dielectric constant $\epsilon_2$, and when the sum of the thicknesses ($p_1 + p_2$) is appreciably less than the wavelength in the material having the higher dielectric constant, the assembly behaves like an anisotropic homogeneous substance with respect to light.

Let $\epsilon_N$ be the value of the dielectric constant when the field is normal to the layers, and let $\epsilon_L$ be the value of the dielectric constant when the field is parallel to the layers. The two constants are expressed in homogeneous manner, when $p_1$ and $p_2$ are of zero degree. It is therefore convenient to use the parameter:

$$\alpha = \frac{p_1 - p_2}{p_1 + p_2} \quad (8)$$

and to write:

$$\left. \begin{array}{l} \epsilon_N = \dfrac{2\epsilon_1\epsilon_2}{\epsilon_1 + \epsilon_2 - \alpha(\epsilon_1 - \epsilon_2)} \\[6pt] \epsilon_L = \dfrac{1}{2}(\epsilon_1 + \epsilon_2) + \dfrac{\alpha}{2}(\epsilon_1 - \epsilon_2) \end{array} \right\} \quad (9)$$

The parameter $\alpha$ varies between $-1$ and $+1$, so that the above values are obtained when $p_1$ is 0 and when $p_2$ is 0 respectively.

Using a new parameter $\beta$, we can write:

$$\beta = \frac{\epsilon_1 - \epsilon_2}{\epsilon_1 + \epsilon_2} \quad (10)$$

$$\left. \begin{array}{l} \epsilon_N = \dfrac{1}{2}(\epsilon_1 + \epsilon_2) \dfrac{1 - \beta^2}{1 - \alpha\beta} \\[6pt] \epsilon_L = \dfrac{1}{2}(\epsilon_1 + \epsilon_2)(1 + \alpha\beta) \end{array} \right\} \quad (11)$$

In the case of waves having a wavelength of 10 microns, produced by $CO_2$ lasers, the most commonly-used transparent substances are germanium and zinc sulphide, the dielectric constants of which are 16 and 4 respectively. Thin plane layers can be made by condensing vapors of germanium and zinc sulphide alternately, to form relatively thick blocks having the optical properties of an anisotropic crystal at the wavelength of 10 microns. Next, the pseudo-crystal is cut into plates having parallel surfaces, so that the surfaces are perpendicular to the alternate Ge and ZnS layers.

If a beam of rectilinearly polarized light falls perpendicularly on an aforementioned plate having parallel surfaces, its optical path will vary, depending on whether the electric field is parallel to the slow axis, i.e. parallel to the layers, or parallel to the fast axis, i.e. perpendicular to the layers.

The plate having parallel surfaces is said to be a half-wave plate when the difference between the optical paths is equal to a half-wave, which is written as follows, if $l$ denotes the thickness of the plate:

$$l\sqrt{\epsilon_L} - l\sqrt{\epsilon_N} = \lambda/2 \quad (12)$$

Consequently, when a rectilinearly polarized wave travels perpendicularly through a half-wave plate, the directions of polarization at the inlet and at the outlet are symmetrical with respect to the fast and slow axes; use will now be made of this property.

We shall take the case (FIG. 3) of alternate layers bounded by homofocal parabolic cylinders. The focal line of the cylinders, taken as the $Oz$ axis, is the direction of propagation of the wave. The axes of the parabolas are situated in a plane $xOz$ perpendicular to the plane of the drawing. The layers are of variable thickness, since the distance between two parabolic cylinders is at a minimum at the apex of the parabolas, but the ratio between the thickness of two adjacent layers around a single point can be considered constant, so that, starting from this ratio, we can at any point calculate the dielectric constants $\epsilon_N$ and $\epsilon_L$, which will have the same values everywhere.

The directions of the slow and fast axis at each point are respectively given by the tangent and the normal to the parabola extending through this point.

In accordance with a general property of second-order surfaces, the tangent and the normal at a point of a second-order surface are the bisectors of the radius vectors extending from the foci and terminating at these points. In the case of the parabola, one focus is at infinity in the direction of the axis. At any point, therefore, the direction parallel to the axis of the parabola and the radius vector from the focus are symmetrical with respect to the axes formed by the tangent and the normal to the parabola extending through the same point.

If, therefore, the height of the parabolic cylinders (i.e. the thickness of the system counted along $Oz$) is such that the resulting plate having parallel surfaces is a half-wave plate, incident waves linearly polarized parallel to the $Ox$ axis of the parabolas come out radially polarized from the focal line, whereas incident waves linearly polarized perpendicular to the $Ox$ direction, i.e. along $Oy$, come out polarized perpendicular to the radius vector, so that the lines of force become circles centered on the focal line.

We now have to solve some problems of matching. If the lenses are made of germanium for which $\epsilon = 16$, anti-reflection layers must be provided. In practice, these are layers of zinc sulphide ($\epsilon = 4$), the thickness of which should be a whole number of quarter-waves in the material.

We must therefore find the conditions under which Ge-ZnS laminated half-wave plates can be used as a matching layer for germanium. First, their two indices should be near the index of zinc sulphide. In other words, in the anisotropic medium, the germanium layers should be thin compared with the zinc sulphide layers.

The conditions for matching, in conjunction with the condition that the half-wave plate effect should occur, are as follows:

$$\left. \begin{array}{l} l\sqrt{\epsilon_L} = (2K+1)\lambda/4 \\ l\sqrt{\epsilon_N} = (2K-1)\lambda/4 \end{array} \right\} \quad (13)$$

K being a whole number which will be greater in proportion as it is desired that $\epsilon_L$ should be nearer to $\epsilon_N$ and nearer to the value of $\epsilon$ corresponding to pure sulphide. By calculating the ratio for each term and by squaring the equations (12) allowing for (10), we obtain:

$$\frac{\epsilon_L}{\epsilon_N} = \frac{1 - \alpha^2\beta^2}{1 - \beta^2} = \frac{(2K+1)^2}{(2K-1)^2} \quad (14)$$

which enables us to calculate $\alpha^2$ and gives two possible values for $\alpha$ corresponding to values of $(p_1/p_2)$ which are the reciprocals of one another. The value is chosen which corresponds to the smaller thickness of germanium.

Let $p_2$ be the thickness of the germanium layers and let $\epsilon_2$ be the corresponding dielectric constant; a series expansion (assuming that $K$ is large and $\alpha$ is approximately 1) gives:

$$\frac{p_2}{p_1+p_2} = \frac{1-\beta^2}{\beta^2 K} = \frac{1.78}{K} \qquad (15)$$

so that, for the values of the dielectric constants:

$$\epsilon_L = \epsilon_1 \left[ 1 + \frac{2\epsilon_2}{(\epsilon_2-\epsilon_1)K} \right]$$
$$\epsilon_N = \epsilon_1 \left[ 1 + \frac{2\epsilon_1}{(\epsilon_2-\epsilon_1)K} \right] \qquad (16)$$

In conjunction with formulas (13), formula (16) can be used to calculate the thickness $l$ of the half-wave plates. Consequently, the system is completely determined.

Figure 4:
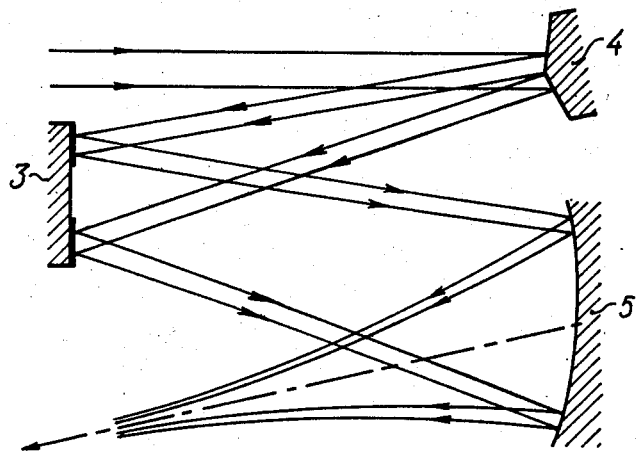
FIG. 4 shows the structure of a device according to the invention, using reflecting elements.
Figure 5:
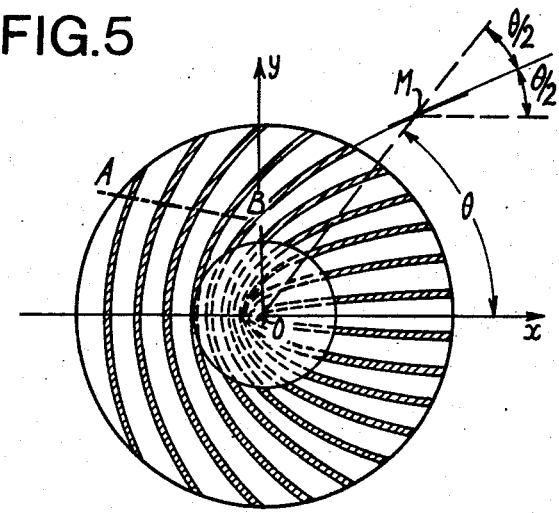
FIGS. 5 and 6 show embodiments of elements used in the device in FIG. 4.
Figure 6:
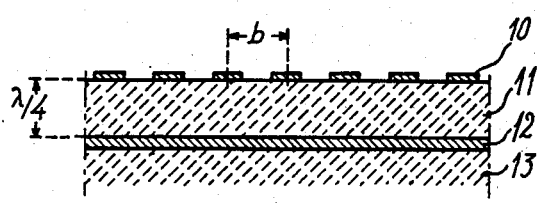

We shall now, with reference to FIGS. 4, 5 and 6, describe another embodiment of the invention, in which lenses are replaced by reflecting optical systems. As is well known, a lens can always be replaced by a mirror in order to obtain a given optical effect.

The invention also provides a system of conductive grids disposed at a quarter of a wavelength from a plane mirror which, by reflection, changes the polarization in the same manner as the aforementioned anisotropic layer. As a first approximation we can say that waves polarized parallel to the bars of the conductive grid are reflected by the grid, whereas waves polarized perpendicular to the bars travel through the grid and are reflected a quarter-wavelength further on by the plane mirror. The latter component of the electromagnetic radiation, therefore, is phase-shifted by half a wavelength with respect to the component polarized parallel to the bars.

This effect is similar to that produced by "half-wave" anisotropic plates, which are known in optics.

We have also shown how, by ensuring that the slow local axes are always tangential to a system of homofocal parabolas, we can obtain a system which transforms the linearly polarized wave into a wave whose electric lines of force are circles centered on the focal line of the system of parabolas.

We shall now show that the same effect is obtained by bounding the reflecting metal bars by homofocal parabolas.

Referring first to FIG. 4, mirrors 4 and 5 perform exactly the same function as lenses 1 and 2 in FIG. 2.

The polarization transformer is denoted by reference 3, as in FIG. 2. The transformer, which is shown in section in FIG. 4, is shown in front view and on a larger scale in FIG. 5. FIG. 5 shows a reflecting grid, the bars of which are bounded by homofocal parabolas. FIG. 6 shows part of the cross-section of the device, on a very large scale.

We have already calculated how the thickness of the lenses should be varied in dependence on the distance from the central axis, in order to convert the Gaussian beam from the laser into a conical beam through lens 1 in FIG. 2 and into a convergent beam through lens 2.

The calculation can easily be adapted to the case of mirrors which, in the present case, are used at an incidence very near to normal incidence. The deflection of the rays with respect to the axis of propagation should be the same in both cases.

Hereinafter, $e(r)$ denotes the thickness of the lens expressed in dependence on the distance $r$ of the point thereof in question from the central axis of the device, $n$ denotes the refractive index of the substance of which it is made, and $e'(r)$ denotes the distance between each point on the mirror and a reference plane expressed as a function of the distance $r$ between the point in question and the same central axis.

In the first case, the angle of deflection of the rays is $(n-1)de/dr$; in the second case it is equal to $2(de/dr)$. The calculation, therefore, can easily be adapted from lenses to mirrors, and the areas of mirrors 4 and 5 (FIG. 4) can easily be determined.

The polarization transformer is more clearly illustrated in FIGS. 5 and 6, which give a front view of the assembly (FIG. 5) and a detail (FIG. 6) of a section along a plane perpendicular to the bars, e.g. along the line AB in FIG. 5.

FIG. 6 shows a metal grid 10 separated from a metal mirror 12 by a transparent substance 11 having a thickness equal to a quarter of a wavelength, the wavelength being measured in the same substance. Support 13 plays only a mechanical part in the operation of the system, but should preferably have the same coefficient of thermal expansion as substance 11.

We shall now give the dimensions of the system in the case of waves having a wavelength of 10 $\mu$ (10 microns). The transparent substance 11 will be zinc sulphide which, at this wavelength, has an index of approximately 2; the thickness of layer 11 will therefore be 1.25 $\mu$.

The device is constructed as follows.

Support 13 is made from glass having the same coefficient of expansion as zinc sulphide. The surface on which the polarization transformer is to be constructed is given a perfect polish, after which a layer of gold 12 having a thickness of 0.1 or 0.2 $\mu$ is applied by condensation in vacuo, followed by a similarly-applied 1.25 $\mu$ layer of zinc sulphide and a second layer of gold 0.1 $\mu$ thick, in which the grid is cut by photo-cutting. To this end, the gold film is covered with a photosensitive resin on which an image is produced by ultra-violet rays, by projecting a suitable-reduced image of the grid drawn on a large scale. The methods of developing the image, corroding the gold layer and removing the remaining resin are well known.

In order to ensure that the system operates without producing an interference fringe, the distance between the bar axes, denoted by $b$ in FIG. 6, should be less than the wavelength in air. For example, the bars can be 4 $\mu$ wide and the spacing between the bars can be 3 $\mu$.

We have assumed that the short-circuit plane was the grid plane for waves polarized parallel to the bars, whereas the plane of mirror 12 performed a corresponding function for perpendicularly polarized waves. This need not be so, however; if the mirror 12 and the medium 11 having a thickness equal to a quarter-wavelength produce an infinite impedance in the plane of grid 10, the electric impedance presented to the waves by the system is equal to the grid impedance, i.e. is an inductance if the dielectric field is parallel to the bars and a capacitance if the field is perpendicular to the bars. A consequence of Babinet's theorem is that the impedances have reciprocal values, so that, if the incident plane wave is broken up into a component polarized parallel to the bars and a component polarized perpendicular to the bars, the two components, on reflection, are phase-shifted through 180° with respect to one another.

Consequently, the mode transformer is completely determined.

The invention also relates to an alternative embodiment of the reflection system, which differs from the embodiment described with reference to FIGS. 5 and 6 with regard to the method of manufacturing it, according to which a system of reflecting elements or "grid" is manufactured by engraving. One advantage of the last-mentioned method is that the resulting apparatus is more resistant to the radiation of waves having peak powers of the order of 1 megawatt or more, thanks to the application of photogravure to a solid metal. To this end, a metal mirror, made e.g. of polished copper, is covered with a layer of photosensitive resin on which an image having the desired outlines (e.g. those shown in FIG. 5) is formed by ultra-violet rays, so as to expose the metal at the places which are to be hollowed. Next, the component is placed in a fairly hot chromatosulphuric bath (between 60° and 80°C) and the metal is removed by electrolysis. The resulting grooves are fairly regular but their outline is too vague for a complete calculation to be made of the reflection coefficients presented to the radiation in dependence on the polarization thereof. Accordingly, the grooves will be given their final depth by successive approximation.

Figure 7:
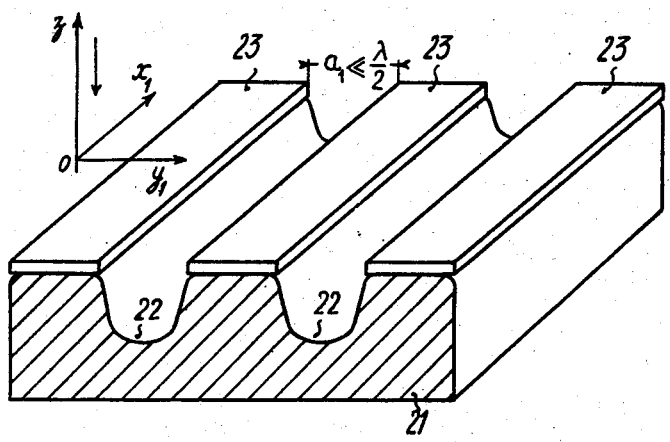
FIG. 7 shows an embodiment of an element of FIG. 4 advantageously obtained by a photogravure method.

The last-mentioned embodiment of the invention will be more clearly understood from the accompanying FIG. 7 which shows a portion of a grid obtained by the aforementioned method of engraving.

FIG. 7 is referred to a system of rectangular axes $Ox_1$, $y_1$, $z$, the plane of the $Ox_1$ and $Oy_1$ axes being parallel to the plane $Oxy$ in FIG. 5, whereas the $Ox_1$ and $Oy_1$ axes are parallel and perpendicular respectively, at each point, to the local direction of the lines along the bottoms of grooves such as (22, 22) formed on the top surface of the metal block 21. The lines are branches of homofocal parabolas in a plane parallel to $Ox_1y_1$. Parts (23,23,23) of the same surface are covered with photosensitive resin on which an image is not formed, and are therefore non-reflecting.

On the drawing, the lines bounding the aforementioned parts and the lines along the bottoms of the grooves appear straight, since the drawing shows a very small part of the length of the lines in question, for which the $Ox_1$ and $Oy_1$ axes can be considered to have constant directions.

The incident waves are projected parallel to $Oz$ in the direction of the arrow. Components of the waves which are polarized parallel to $Ox_1$ cannot penetrate deeply into the groove, whose width $a_1$ and spacing are made much smaller than the half-length $\lambda/2$ of the waves. On the other hand, components of the same waves which are polarized parallel to $Oy_1$ are reflected on the bottom of the grooves, the depth of which is adjusted to that the latter waves travel an extra distance equal to $\lambda/2$ with respect to waves polarized parallel to $Ox_1$.

In practive, a special terminal printing device is used to construct the parabolas, or, more specifically, the ultra-violet image of the system of parabolas which is projected on to the layer of photosensitive resin as explained hereinbefore. The printing device is controlled by a computer and the printing component thereof draws the system in question, in accordance with the formula.

$$y = \frac{Rx^2}{n_1^2 \beta_1^2} - \frac{n_1^2 \beta_1^2}{4R} \qquad (17)$$

wherein $R$ is a constant having the physical dimension of a length, $n_1$ is an integer equal to each whole number in succession oand $\beta_1$ is the distance between two adjacent parabolas. A simple calculation shows that the different parabolas represented by the aforementioned formula are homofocal and have a constant spacing at the same distance R from the common focus taken as the origin of the $Oxy$ axes in FIG. 5.

When an image of the desired system of curves has been constructed, using the computer and the aforementioned terminal printing device, the image is photographically reduced to dimensions suitable for performing the photogravure process explained hereinbefore.

What I claim is:

1. A device for transforming a beam of rectilinearly polarized electromagnetic waves parallel to an axis into waves polarized in accordance with a symmetry of revolution, comprising a divergent first lens having an axis parallel to said axis and transforming said beam into a divergent conical beam, a convergent second lens having the same axis as said first lens and transforming said divergent beam into a convergent beam converging in a focus region of said second lens, at least one surface of said first lens being cut in a conical shape of revolution around its axis and said second lens having a plane front surface covered with an assembly of plane layers of anisotropic dielectric material whose propagation axes are directed at each point of said surface so as to transform said convergent beam into a wave polarized in accordance with a mode of revolution around said axis of said second lens, said second lens also having a convex back surface causing the transformed wave to converge in said focusing region; in which said assembly of layers forms half-wave plates and comprises a stack of thin layers alternately made of one and the other of two anisotropic substances having different dielectric constants, said substances being germanium and zinx sulphide.

2. A device for transforming a parallel beam of rectilinearly polarized electromagnetic waves parallel to an axis into waves polarized in accordance with a symmetry of revolution, in which said parallel beam is received by a divergent first mirror which transforms it into a divergent conical beam and in which said divergent beam is directed to to a polarization transforming second mirror and thereafter to a convergent third mirror concentrating said transformed beam in a focusing region of said third mirror, said first mirror being cut in a substantially conical shape of revolution around its axis, said polarization transforming second mirror being made up of a system of plane reflecting elements each bounded in its plane by one of a group of homofocal parabolas and spaced from a plane mirror by substantially a quarter wave-length thickness of anisotropic dielectric material, and said third mirror causing the beam reflected by said reflecting elements and plane mirror to reconverge into said focusing region.

3. A device as claimed in claim 2, in which said reflecting elements are made of zinc sulphide.

4. A device as claimed in claim 1, in which each of said layers is limited in its plane by one of a group of homofocal parabolas.

* * * * *